United States Patent
Yao et al.

(10) Patent No.: US 10,790,505 B2
(45) Date of Patent: Sep. 29, 2020

(54) ELECTROCHEMICAL CELLS HAVING IMPROVED IONIC CONDUCTIVITY

(71) Applicant: EnPower, Inc., Phoenix, AZ (US)

(72) Inventors: Adrian Yao, Phoenix, AZ (US); Jonathan Hwang, Phoenix, AZ (US)

(73) Assignee: EnPower, Inc., Phoenix, AZ (US)

( * ) Notice: Subject to any disclaimer, the term of this patent is extended or adjusted under 35 U.S.C. 154(b) by 0 days.

(21) Appl. No.: 16/582,639

(22) Filed: Sep. 25, 2019

(65) Prior Publication Data

US 2020/0020937 A1    Jan. 16, 2020

Related U.S. Application Data

(63) Continuation-in-part of application No. 16/239,396, filed on Jan. 3, 2019, which is a continuation of application No. 16/010,104, filed on Jun. 15, 2018, now abandoned.

(60) Provisional application No. 62/647,332, filed on Mar. 23, 2018.

(51) Int. Cl.
| | |
|---|---|
| H01M 4/36 | (2006.01) |
| H01M 4/1391 | (2010.01) |
| H01M 4/485 | (2010.01) |
| H01M 4/62 | (2006.01) |
| H01M 4/131 | (2010.01) |
| H01M 4/133 | (2010.01) |
| H01M 4/587 | (2010.01) |
| H01M 4/1393 | (2010.01) |
| H01M 10/0525 | (2010.01) |
| H01M 4/04 | (2006.01) |
| H01M 4/02 | (2006.01) |

(52) U.S. Cl.
CPC ........ *H01M 4/366* (2013.01); *H01M 4/0404* (2013.01); *H01M 4/0435* (2013.01); *H01M 4/131* (2013.01); *H01M 4/133* (2013.01); *H01M 4/1391* (2013.01); *H01M 4/1393* (2013.01); *H01M 4/485* (2013.01); *H01M 4/587* (2013.01); *H01M 4/621* (2013.01); *H01M 10/0525* (2013.01); *H01M 2004/027* (2013.01)

(58) Field of Classification Search
CPC ...... H01M 4/366; H01M 4/485; H01M 4/131; H01M 4/133
See application file for complete search history.

(56) References Cited

U.S. PATENT DOCUMENTS

| | | | |
|---|---|---|---|
| 2012/0164530 A1* | 6/2012 | Temmyo | H01M 4/133 429/211 |
| 2014/0287316 A1* | 9/2014 | Ahn | H01M 10/0525 429/231.8 |
| 2016/0285101 A1* | 9/2016 | Yoshio | H01M 4/622 |

(Continued)

*Primary Examiner* — Jonathan G Jelsma
(74) *Attorney, Agent, or Firm* — Kolitch Romano LLP

(57) ABSTRACT

Electrochemical cells of the present disclosure may include one or more multilayered electrodes. One or both multilayered electrodes may be configured such that a second layer farther from the current collector has a higher resistance to densification than a first layer closer to the current collector. This may be achieved by including a plurality of non-active ceramic particles in the second layer. Accordingly, calendering of the electrode results in a greater compression of the first layer, and a beneficial porosity profile is created. This may improve the ionic conductivity of the electrode, as compared with known systems.

20 Claims, 11 Drawing Sheets

(56) References Cited

U.S. PATENT DOCUMENTS

2019/0051906 A1* 2/2019 Rhee .................. C01F 7/30
2019/0296308 A1* 9/2019 Antonopoulos .... H01M 2/1646

* cited by examiner

ELECTROCHEMICAL CELLS HAVING IMPROVED IONIC CONDUCTIVITY

FIELD

This disclosure relates to devices and methods for electrochemical devices that include a composite porous electrode. More specifically, disclosed embodiments relate to multilayer electrodes for batteries.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium ion polymer (Li-ion polymer).

SUMMARY

The present disclosure provides systems, apparatuses, and methods relating to electrochemical cells having one or more multilayer electrodes In some embodiments, an electrochemical cell may include: a first electrode and a second electrode on opposing sides of a separator, the first electrode including an active material composite layered onto a current collector substrate; wherein the active material composite of the first electrode comprises: a first layer adjacent to and in contact with the current collector substrate, the first layer including a plurality of first active material particles; a second layer intermediate the first layer and the separator, the second layer including a plurality of second active material particles mixed with a plurality of non-active ceramic particles, each one of the plurality of non-active ceramic particles consisting of a non-active ceramic material, such that the second layer is configured to have a higher pore volume fraction than the first layer, and wherein the electrochemically inactive ceramic particles have particle sizes on a same order of magnitude as the second active material particles.

In some embodiments, an electrochemical cell may include: a first electrode and a second electrode on opposing sides of a separator, the first electrode including an active material composite layered onto a current collector substrate; wherein the active material composite of the first electrode comprises: a first layer adjacent to and in contact with the current collector substrate, the first layer including a plurality of first active material particles; a second layer intermediate the first layer and the separator, the second layer including a plurality of second active material particles mixed with a plurality of non-active ceramic particles, each one of the plurality of non-active ceramic particles consisting of a non-active mesoporous or macroporous ceramic material, such that the second layer is configured to have a higher pore volume fraction than the first layer, and wherein the electrochemically inactive ceramic particles have particle sizes on a same order of magnitude as the second active material particles.

Features, functions, and advantages may be achieved independently in various embodiments of the present disclosure, or may be combined in yet other embodiments, further details of which can be seen with reference to the following description and drawings.

DETAILED DESCRIPTION

Figure 1:
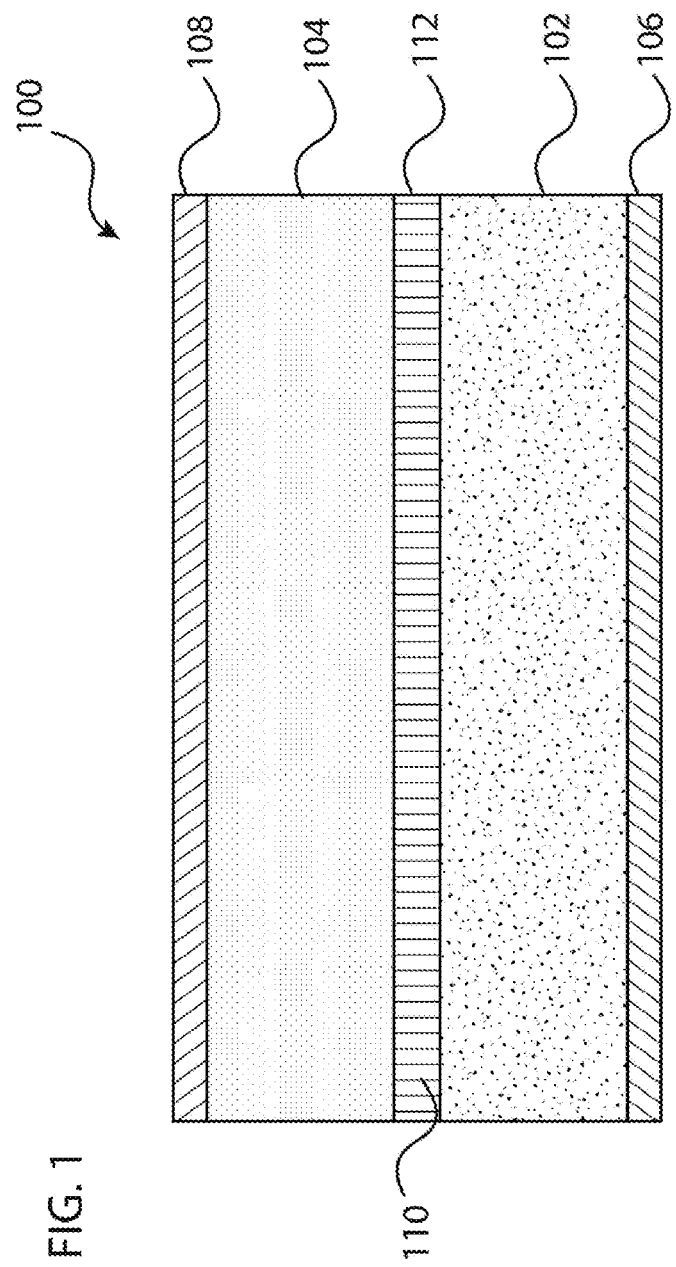
FIG. 1 is a schematic sectional view of an illustrative electrochemical cell.

Various aspects and examples of electrochemical cells having improved ionic conductivity resulting at least in part from the addition of non-active ceramic particles to an upper layer of a multilayer electrode, as well as related methods, are described below and illustrated in the associated drawings. Unless otherwise specified, electrochemical cells and electrodes in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Li" means lithium.

"Li+" or "Li-ion" means lithium ion.

"Secondary battery" means a rechargeable battery, e.g., a type of electrical battery which can be charged, discharged by a load, and recharged multiple times.

"NCA" means Lithium Nickel Cobalt Aluminum Oxide ($LiNiCoAlO_2$).

"NMC" or "NCM" means Lithium Nickel Cobalt Manganese Oxide ($LiNiCoMnO_2$).

"LFP" means Lithium Iron Phosphate ($LiFePO_4$).

"LMO" means Lithium Manganese Oxide ($LiMn_2O_4$).

"LNMO" means Lithium Nickel Manganese Spinel ($LiNi_{0.5}Mn_{1.5}O_4$).

"LCO" means Lithium Cobalt Oxide ($LiCoO_2$).

"LTO" means Lithium Titanate ($Li_2TiO_3$).

"NMO" means Lithium Nickel Manganese Oxide ($Li(Ni_{0.5}Mn_{0.5})O_2$).

"Non-active" refers to a material that is electrochemically inactive and electrically nonconductive, and that does not exhibit chemical reaction or intercalation with the working ions (e.g., lithium ions) of an electrochemical device. Non-active materials in the examples below may include particles having internal porosities or conduction channels through the particles, but the particles do not chemically interact with the ions in any substantive way.

"D50" refers to the mass-median-diameter, corresponding to an average particle size by mass. Unless otherwise indicated, particle sizes referenced herein should be understood in D50 terms.

"Microporous" refers to a material containing pores having diameters less than 2 nanometers (nm).

"Mesoporous" refers to a material containing pores having diameters of 2 nm to 500 nm.

"Macroporous" refers to a material containing pores having diameters greater than 500 nm.

Overview

In general, electrochemical cells of the present disclosure may include one or more multilayered electrodes. One or both multilayered electrodes may be configured such that a second layer farther from the current collector has a higher resistance to densification than a first layer closer to the current collector. This higher resistance may be achieved by including a plurality of non-active particles in the second layer that have a greater hardness than the active materials of the first layer. These non-active materials may comprise a ceramic (e.g., alumina). Accordingly, calendering of the electrode results in a greater compression of the first layer, and a beneficial porosity profile is created. This porosity profile may improve the ionic conductivity of the electrode, as compared with known systems.

A manufacturing method for electrodes of the present disclosure may include the following steps:

(a) forming a first layer by coating a first active material composite onto a current collector substrate, wherein the first active material composite includes a plurality of first active material particles;

(b) forming a second layer by coating a second active material composite onto the first layer, wherein the second active material composite includes a plurality of second active material particles and a plurality of non-active particles having a hardness greater than that of the first active material particles, such that the second layer is configured to have a lower overall compressibility than the first layer; wherein the first layer, the second layer, and the current collector substrate collectively form a composite electrode; and (c) causing the first layer to be compressed to a greater degree than the second layer by calendering the composite electrode.

Examples, Components, and Alternatives

The following sections describe selected aspects of exemplary electrochemical cells and electrodes having improved ionic conductivity, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electrochemical Cell

With reference to FIG. 1, an electrochemical cell 100 is illustrated in the form of a lithium-ion battery. Electrochemical cell 100 is an example of a type of electrochemical cell suitable for including one or more of the electrodes described herein. Cell 100 includes a positive and a negative electrode, namely a cathode 102 and an anode 104. The cathode and anode are sandwiched between a pair of current collectors 106, 108, which may comprise metal foils or other suitable substrates. Current collector 106 is electrically coupled to cathode 102, and current collector 108 is electrically coupled to anode 104. The current collectors enable the flow of electrons, and thereby electrical current, into and out of each electrode. An electrolyte 110 disposed throughout the electrodes enables the transport of ions between cathode 102 and anode 104. In the present example, electrolyte 110 includes a liquid solvent and a solute of dissolved ions. Electrolyte 110 facilitates an ionic connection between cathode 102 and anode 104.

Electrolyte 110 is assisted by a separator 112, which physically partitions the space between cathode 102 and anode 104. Separator 112 is liquid permeable, and enables the movement (flow) of ions within electrolyte 110 and between each of the electrodes. In some embodiments, electrolyte 110 includes a polymer gel or solid ion conductor, augmenting or replacing (and performing the function of) separator 112.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, or more specifically, an electrode microstructure.

In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, the chemistry of the active material particles differs between cathode 102 and anode 104. For example, anode 104 may include graphite (artificial or natural), hard carbon, titanate, titania, silicon monoxide, transition metals in general, elements in group 14 (e.g., carbon, silicon, tin, germanium, etc.), oxides, sulfides, transition metals, halides, and chalcogenides. On the other hand, cathode 102 may include transition metals (for example, nickel, cobalt, manganese, copper, zinc, vanadium, chromium, iron), and their oxides, phosphates, phosphites, and silicates. The cathode may also include alkalines and alkaline earth metals, aluminum, aluminum oxides and aluminum phosphates, as well as halides and chalcogenides. In some examples, active material particles may have a particle size between 1 and 50 μm. In some examples, active material particles may have a particle size between 5 and 30 μm. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc.).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on the mobility of lithium-ions in the liquid phase of the electrolyte, which is affected by the tortuosity of the porous electrode composite structure.

B. Illustrative Manufacturing Process

Typical manufacturing processes for lithium-ion batteries usually start with a slurry mixture for each of the two electrodes. The anode electrode slurry may contain at least one active material component (e.g., artificial graphite, natural graphite, hard carbon, silicon monoxide, silicon, lithium titanate oxide, other elements in group 14, oxides, sulfides, transition metals, halides, and/or chalcogenides), at least one conductive aid (e.g., carbon black, acetylene black, ketjen black, carbon nanotubes, carbon fibers, and/or graphite flakes), and at least one binder or a binder mixture (e.g., polyvinylidene difluoride (PVdF) and/or a mixture of carboxyl-methyl-cellulose (CMC) and styrene-butadiene rubber (SBR)). Depending on the binder system chosen, a solvent for the slurry may be water or n-methyl-2-pyrrolidone (NMP).

In contrast, the cathode electrode slurry may contain at least one active material component, e.g., a layered oxide material containing transition metals (e.g., nickel, cobalt, manganese, copper, zinc, vanadium, chromium, iron) and their oxides, phosphates (e.g., lithium iron phosphate), phosphites, and/or silicates. Furthermore, the cathode electrode slurry may contain at least one conductive aid (e.g., carbon black, acetylene black, ketjen black, carbon nanotubes, carbon fibers, and/or graphite flakes), and at least one binder (e.g., polyvinylidene difluoride (PVdF)).

The respective electrode slurries are typically then deposited (e.g., casted) onto moving substrate foils in a roll-to-roll processing step, thereby coating the substrate with the slurry. The anode slurry is typically casted onto a copper foil substrate and the cathode slurry is typically casted onto an aluminum foil substrate. The coating step may be performed by a slot-die coating head, but other processes may include comma-roll coating, reverse comma-roll coating, knife over roll coating, mayer rod coating, gravure coating, and/or microgravure coating. The coating step typically involves a drying step immediately after the slurry is cast onto the moving substrate foils to evaporate the solvent material in at least one drying oven. The resulting dried electrode forms a porous electrode composite material on the substrate foils.

As both ohmic and ionic conductivity are paramount in the operation of a lithium-ion battery, the as-coated electrodes must be compressed to a desired thickness and porosity in a step known as calendering, where the electrodes are compressed between two rollers. This step is critical as the active materials must be compressed sufficiently enough to ensure electrical percolation and create a low ohmic-resistance path through the thickness of the electrode bulk for electrons to travel. However, enough porosity must be maintained in the electrode bulk to also allow for sufficient lithium-ion mobility in the liquid phase of the electrolyte.

Under-compressing the electrode can result in a high-porosity electrode structure having good ionic conductivity but high ohmic-impedance. The high ohmic impedance would limit electron current flow, significantly limiting the discharge or charge rate capabilities of the electrode. An under-compressed electrode bulk can also have a much greater electrode thickness. This may result in a reduction in the volumetric energy density of the cell.

In contrast, over-compressing the electrode can result in good ohmic conductivity but high ionic-impedance. The high ionic impedance would cause "electrolyte starvation" within the electrode bulk, significantly limiting the discharge or charge rate capabilities of the electrode. An over-compressed electrode bulk can also have a much thinner electrode thickness, resulting in an increase in the volumetric energy density of the cell.

These engineering trade-offs apply to both the anode and the cathode. Thus, the calendering step is a critical step in the manufacture of high-performance lithium-ion batteries to achieve the right balance of ohmic or ionic conductivity and cell energy density.

A typical lithium-ion battery has anode and cathode electrodes with uniform properties throughout their electrode composite bulks. Thus, it is reasonable to estimate that the calendering step compresses the entire electrode bulk homogeneously. In other words, the resulting density of any portion of the electrode is substantially the same as any other portion. An exception to this may be the surface layer of the electrode that mates with the calendering roll (i.e., opposite the surface that mates with the current collector). This surface layer is compressed to a higher density, due to a "crust" formation as certain particles become flattened by the calendering roll.

C. Illustrative Effects of Manufacturing Process on Multilayer Electrodes

In the non-typical case where an electrode has a multi-layered structure, the resulting densification due to the calendering process will no longer be homogeneous throughout the thickness of the electrode. This is because the resulting densification will necessarily depend on the compressibility of each composite layer of the electrode, i.e., their specific resistance to densification. Suppose an electrode has a first layer adjacent the current collector with a composite structure resulting in a higher level of compressibility (lower resistance to densification) compared to a second layer and the separator (which has a lower level of compressibility). In this example, the compressive forces imparted by the calendering rolls will result in a multilayered electrode structure where the first layer has been densified to a higher degree as compared to the second layer. In most cases, this will also result in a first layer which has a lower porosity compared to the second layer. As used herein, the term "porosity" is intended to refer to pore volume fraction (unless indicated otherwise), such that the porosity includes (i.e., takes into account) both interparticle porosity and intraparticle porosity.

From the perspective of ionic conductivity, this type of electrode, featuring lower porosity near the current collector and increased porosity near the separator may be favorable as it can counteract a natural electrolyte-concentration gradient field resulting from polarization of the cell. This would mitigate the phenomenon of electrolyte starvation and improve the lithiation or delithiation rate capability of the electrode.

If the first layer adjacent the current collector instead has a composite structure resulting in a lower level of compressibility (higher resistance to densification) compared to a second layer and the separator, then the compressive forces imparted by the calendering rolls will cause the first layer to be densified to a lower degree compared to the second layer. In most cases, this will result in a first layer which has a higher porosity compared to the second layer.

From the perspective of ionic conductivity, this type of electrode featuring lower porosity near the separator and increased porosity near the current collector may be unfavorable as it can contribute to the natural electrolyte concentration gradient filed resulting from polarization of the cell. This would exacerbate the phenomenon of electrolyte starvation, effectively "choking" off regions of the electrode, and inhibiting the lithiation or delithiation rate capability of the electrode.

Methods of the present disclosure counteract the effects of a lower porosity near the separator by mixing hard, non-active particle additives within the second layer slurry. This is done to create a second layer that exhibits lower levels of compressibility. Addition of the non-active ceramic particles facilitates transfer of compressive loads imparted by the calendering rolls to the first layer to preferentially compress the first layer. In some examples, non-active particle additives have a particle size on the same order of magnitude as active material particles included in the second layer. In some examples, the non-active particle size may be 1 to 50 µm. In some examples, non-active particle additives may have a particle size of 5 to 30 µm. This results in an overall electrode composite structure with a desired porosity profile throughout the thickness of the electrode. Specifically, as mentioned above, the mixing of active particles with similarly-sized non-active particles helps achieve the goals of (1) inducing porosity in the second layer, and (2) transferring load from the second layer (separator side) to the first layer (current collector side).

Non-active particle additives may comprise any suitable electrochemically-inactive and electrically nonconductive ceramic materials, such as aluminum oxide (i.e., alumina ($\alpha$-$Al_2O_3$)), corundum, calcined, tabular, synthetic boehmite, silicon oxides or silica, zirconia, and/or the like. In some examples, non-active particle additives may comprise oxides of metals such as aluminum, silicon, titanium, magnesium, zirconium, hafnium, cerium, lanthanum, cesium, and/or the like.

D. Illustrative Electrode Layer Structures

As shown in FIGS. 2-7, this section describes various illustrative embodiments of an electrode incorporating non-active ceramic particle additives within a second composite layer that is separated from the current collector by a first composite layer.

Figure 2:
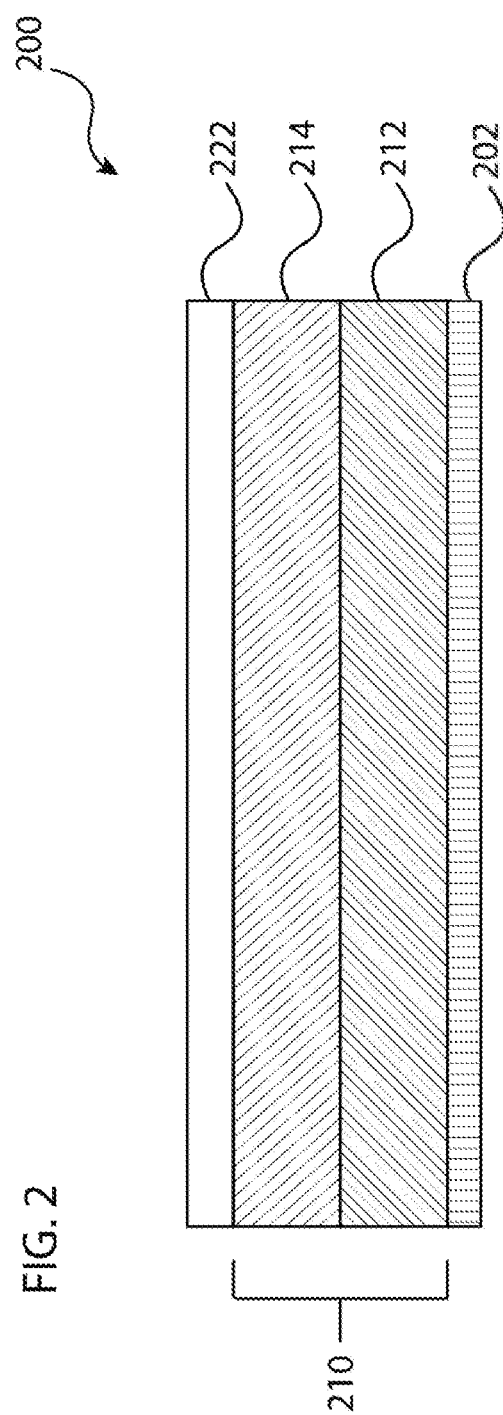
FIG. 2 is a schematic sectional view of an illustrative electrode portion of an electrochemical cell.

FIG. 2 is a schematic sectional elevation view of an electrode portion 200 of an electrochemical cell. In this example, which is not the case in typical batteries, a porous electrode composite 210 is multilayered. Specifically, a first layer 212 is disposed immediately adjacent a current collector substrate 202, and a second layer 214 is sandwiched between first layer 212 and a separator 222. Each of these structures and various embodiments thereof are described in further detail below.

Figure 3:
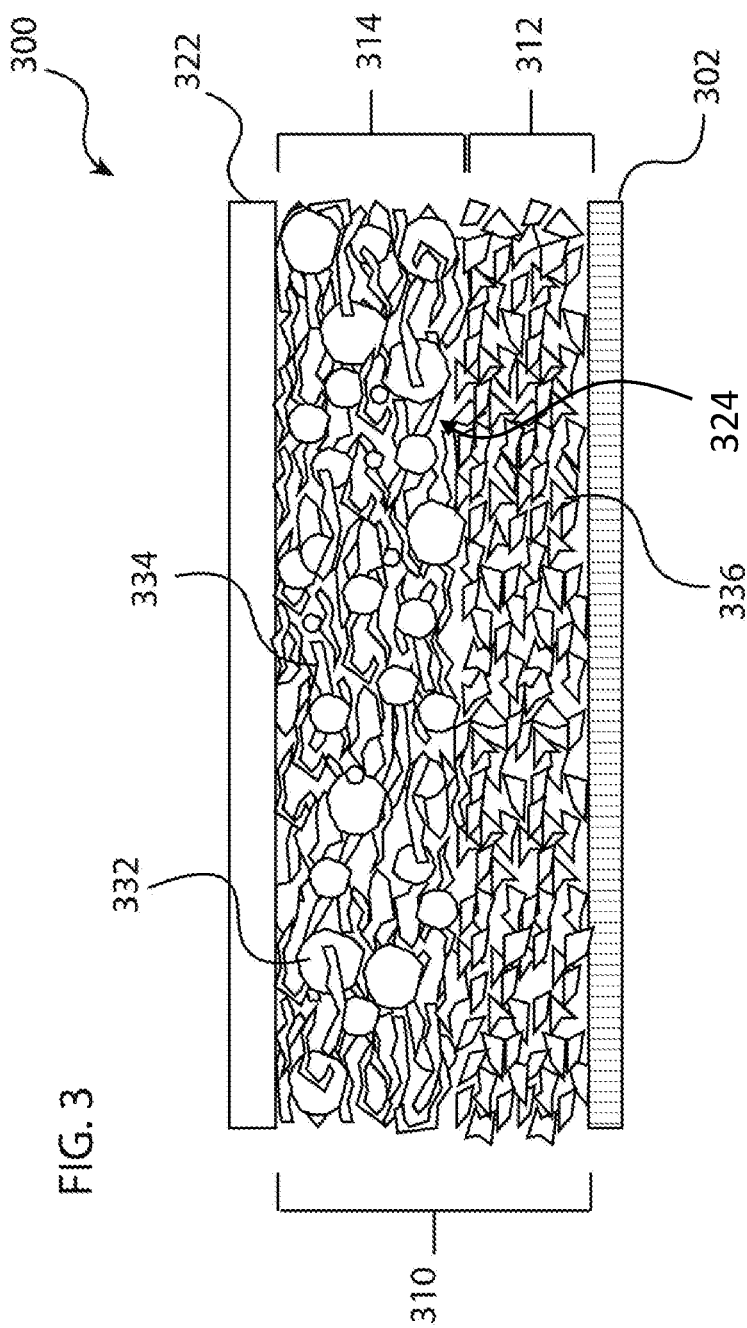
FIG. 3 is a sectional view of a portion of an illustrative electrochemical cell having a multilayered anode electrode, in accordance with aspects of the present disclosure.

FIG. 3 is a partial sectional view of an illustrative electrochemical cell 300 having a multilayered electrode 310.

Electrochemical cell 300 includes a separator 322, an electrolyte 324, and a current collector 302. In this example, electrode 310 is an anode, and includes a first layer 312 adjacent current collector 302 and a second layer 314 intermediate the first layer and separator 322. Both first layer 312 and second layer 314 may be substantially planar, with thicknesses measured relative to a direction perpendicular to current collector 302.

In the present example, first layer 312 includes at least one active material 336 with a first particle size, morphology, and distribution comprising a hard carbon or silicon monoxide or both. Second layer 314 includes at least one active material 334, with a second particle size, morphology, and distribution comprising graphitic carbon (artificial or natural) and at least one non-active material 332, with a third particle size, morphology, and distribution consisting of a ceramic material, such as aluminum oxide, $Al_2O_3$ (AKA alumina). In some examples, a ratio of the volume of non-active ceramic material 332 to an overall volume of second electrode composite layer 314 may be in a range from 2% to 50%, and in some examples from 5% to 50% (i.e., percent by volume). In some examples of multi-layered cathodes (e.g., electrodes including transition metal oxide active material particles), a weight percentage of non-active ceramic material 332 with respect to second electrode composite layer 314 may be in a range from 3% to 40%. In some examples of multi-layered anodes (e.g., electrodes including graphitic or carbonaceous active material particles), a weight percentage of non-active ceramic material 332 with respect to second electrode composite layer 314 may be in a range from 5% to 50%.

Therefore, first composite layer 312 may exhibit lower levels of compressibility as compared to second composite layer 314. This may be, at least in part, due to the relative degrees of crystallinity of the respective materials. Graphite is highly ordered, whereas hard carbons are non-graphitizable, and silicon monoxide particles exhibit areas containing amorphous SiOx. This may also be, at least in part, due to the layers' respective particle morphologies. Hard carbon materials and silicon monoxide materials (i.e., of first layer 312) can typically be found in irregular, fragmented, or angular particle morphologies that tend to have higher levels of resistance to densification, whereas graphitic carbon materials (i.e., of second layer 314) can typically be found in flake-like, oblong, potato-shaped, or spherical particle morphologies that generally do not have as high a resistance to densification.

In this particular embodiment, graphitic carbons (material 334) in second electrode composite layer 314 consist essentially of a flake-like material, such as natural graphite flakes. This morphology has a low resistance to densification. Thus, the inclusion of non-active ceramic particles 332 in second layer 314 facilitates a significant increase in the overall resistance to densification of second layer 314. Accordingly, compressive loads imparted by a typical calendering process are transferred to first layer 312. The resulting post-calendering structure of such an electrode will be a porosity profile in a direction of the thickness of overall electrode composite 310 that is more favorable for electrolyte mobility.

As disclosed in U.S. patent application Ser. No. 15/975,695, a configuration including hard carbon and silicon monoxide materials 336 in first electrode composite layer 312 and graphitic carbon materials 334 in second electrode composite layer 314 helps to counteract the natural electrolyte concentration gradient field that results from polarization. Hard carbon and silicon monoxide materials 336 have lower energies of lithiation in the beginning of their lithiation profiles compared to graphitic carbons. Accordingly, this configuration enables active materials 336 closer to current collector 302 to lithiate at an earlier point in time than active materials 334 closer to separator 322. This allows the reaction front to move from the current collector toward the separator. However, despite this ability of this particular anode electrode architecture to reduce the likelihood of lithium metal plating on the anode surface, it would not be immune to polarization due to electrolyte starvation resulting from poor ionic mobility through an electrode composite. Especially in situations where the electrode's second composite layer has a lower resistance to densification than the electrode's first composite layer, an undesired porosity profile may result upon electrode calendering that worsens electrolyte mobility and exacerbates cell polarization. This can ultimately cause the cell to prematurely reach a set cutoff threshold voltage (upon charging, in the case of anodes), resulting in underutilized capacity. Therefore, in such multilayered electrode configurations, the inclusion of non-active ceramic particles to the second electrode composite layer can help increase the resistance to densification, and may be an important component for preventing excessive electrolyte-related polarization and maximizing capacity utilization.

Figure 4:
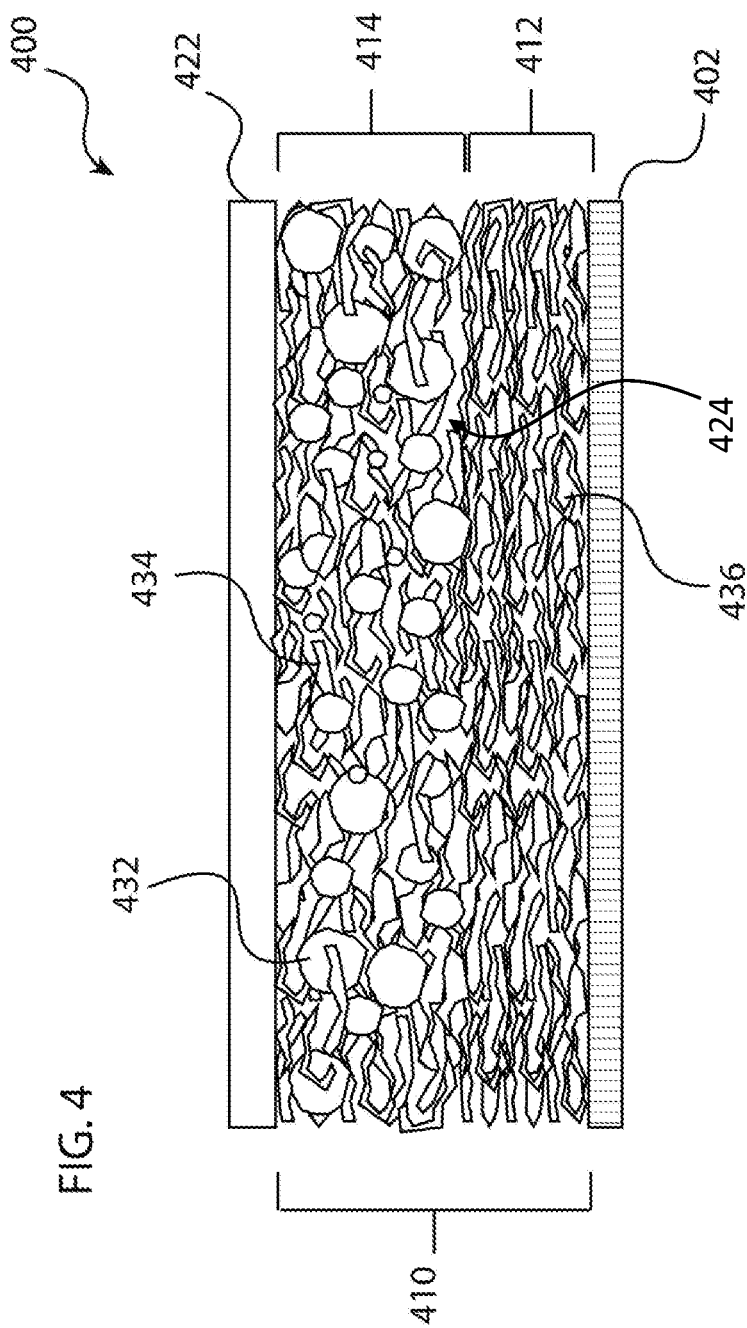
FIG. 4 is a sectional view of a portion of another illustrative electrochemical cell having a multilayered anode electrode, in accordance with aspects of the present disclosure.

FIG. 4 is a partial sectional view of an illustrative electrochemical cell 400 having a multilayered electrode 410. Electrochemical cell 400 includes a separator 422, an electrolyte 424, and a current collector 402. In this example, electrode 410 is again an anode, and includes a first layer 412 adjacent current collector 402, and a second layer 414 intermediate the first layer and separator 422. Both first layer 412 and second layer 414 may be substantially planar, with thicknesses measured relative to a direction perpendicular to current collector 402.

In the present example, the primary active material 436 in first layer 412 and the primary active material 434 in second layer 414 both include a graphitic carbon (artificial or natural). Second layer 414 also includes at least one non-active ceramic material 432 with a third particle size, morphology, and distribution (e.g., aluminum oxide). In some embodiments, a ratio of the volume of non-active ceramic material 432 to an overall volume of second electrode composite layer 414 may be in a range from 2% to 50%, and in some examples from 5% to 50% (i.e., percent by volume). In the example depicted in FIG. 4, both first layer active material 436 and second layer active material 434 exhibit flake-like morphologies. However, graphitic carbon materials 434, 436 can typically be found in flake-like, oblong, potato-shaped, or spherical particle morphologies, and any combination of the above-mentioned graphitic carbon morphologies may be included. In this particular embodiment, the inclusion of non-active ceramic particles 432 serves to increase resistance to densification of second layer 414 compared to that of first layer 412. This facilitates a desired porosity profile across the thickness of the electrode to be produced upon calendering.

Figure 5:
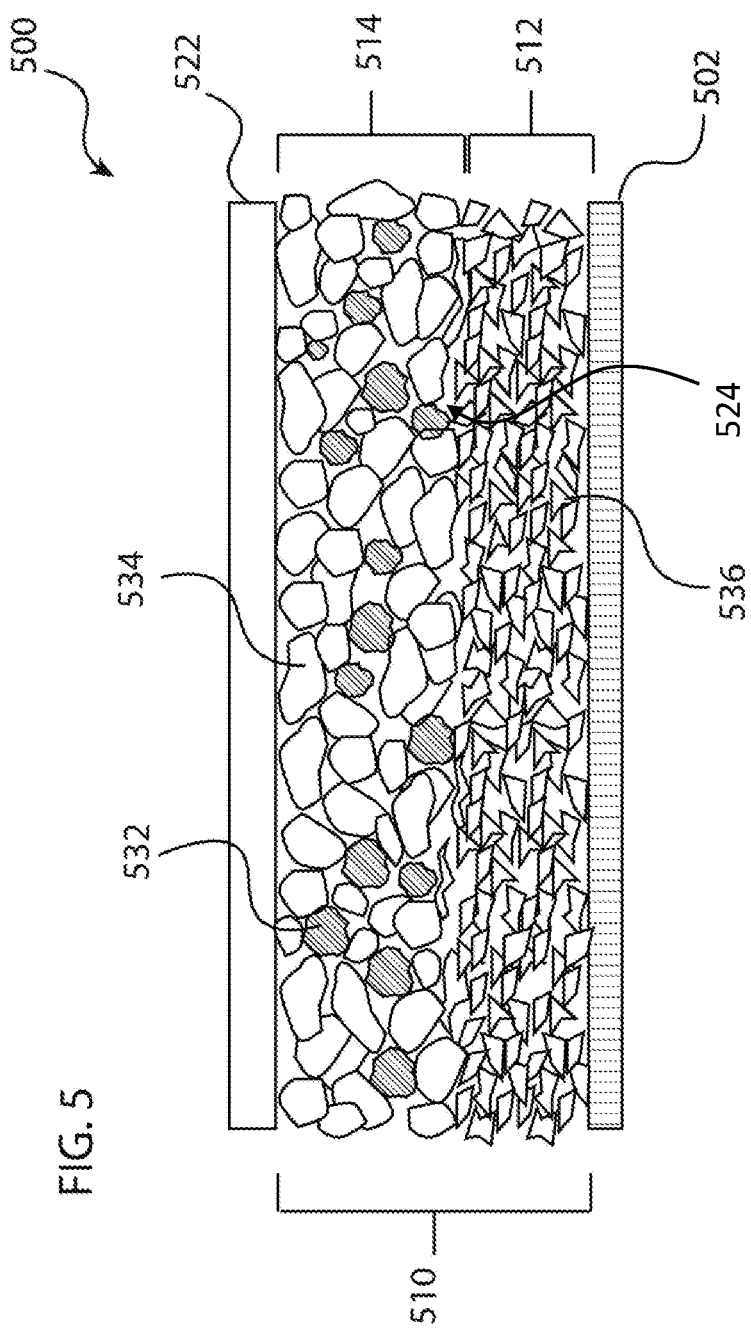
FIG. 5 is a sectional view of a portion of another illustrative electrochemical cell having a multilayered anode electrode in accordance with aspects of the present disclosure.

FIG. 5 is a partial sectional view of an illustrative electrochemical cell 500 having a multilayered electrode 510. Electrochemical cell 500 includes a separator 522, an electrolyte 524, and a current collector 502. In this example, electrode 510 is an anode, and includes a first layer 512 adjacent current collector 502 and a second layer 514 intermediate the first layer and separator 522. Both first layer 512 and second layer 514 may be substantially planar, with thicknesses measured relative to a direction perpendicular to current collector 502.

In the present example, first layer 512 includes at least one active material 536 with a first particle size, morphology, and distribution comprising a hard carbon or silicon monoxide or both. Second layer 514 includes at least one active material 534, with a second particle size, morphology, and distribution comprising graphitic carbon (artificial or natural) and at least one non-active material 532, with a third particle size, morphology, and distribution consisting of a ceramic material, such as aluminum oxide. In some embodiments, a ratio of a volume of non-active ceramic material 532 to an overall volume of second electrode composite layer 514 may be in a range from 2% to 50%, and in some examples from 5% to 50% (i.e., percent by volume). Therefore, first composite layer 512 may exhibit lower levels of compressibility as compared to second composite layer 514. This may be, at least in part, due to the relative degrees of crystallinity of the respective materials. Graphite is highly ordered, whereas hard carbons are non-graphitizable, and silicon monoxide particles exhibit areas containing amorphous SiOx. This may also be, at least in part, due to the layers' respective particle morphologies. Hard carbon materials and silicon monoxide materials (i.e., of first layer 512) can typically be found in irregular, fragmented, or angular particle morphologies that tend to have higher levels of resistance to densification, whereas graphitic carbon materials (i.e., of second layer 514) can typically be found in particle morphologies that generally do not have as high a resistance to densification.

Cell 500 is similar to cell 300. However, in this particular embodiment, unlike that of FIG. 3, graphitic carbons (material 534) in second electrode composite layer 514 include a natural or artificial graphite having spherical, spheroidal, oblong, potato-shaped, and/or shuttle-shaped particles. For example, these particles may be shaped via impact milling or other suitable techniques to have better rate properties. This morphology again has a low resistance to densification. Thus, the inclusion of non-active ceramic particles 532 in second layer 514 facilitates a significant increase in the overall resistance to densification of second layer 514. Accordingly, compressive loads imparted by a typical calendering process are transferred to first layer 512. The resulting post-calendering structure of such an electrode will be a porosity profile in a direction of the thickness of overall electrode composite 510 that is more favorable for electrolyte mobility.

Figure 6:
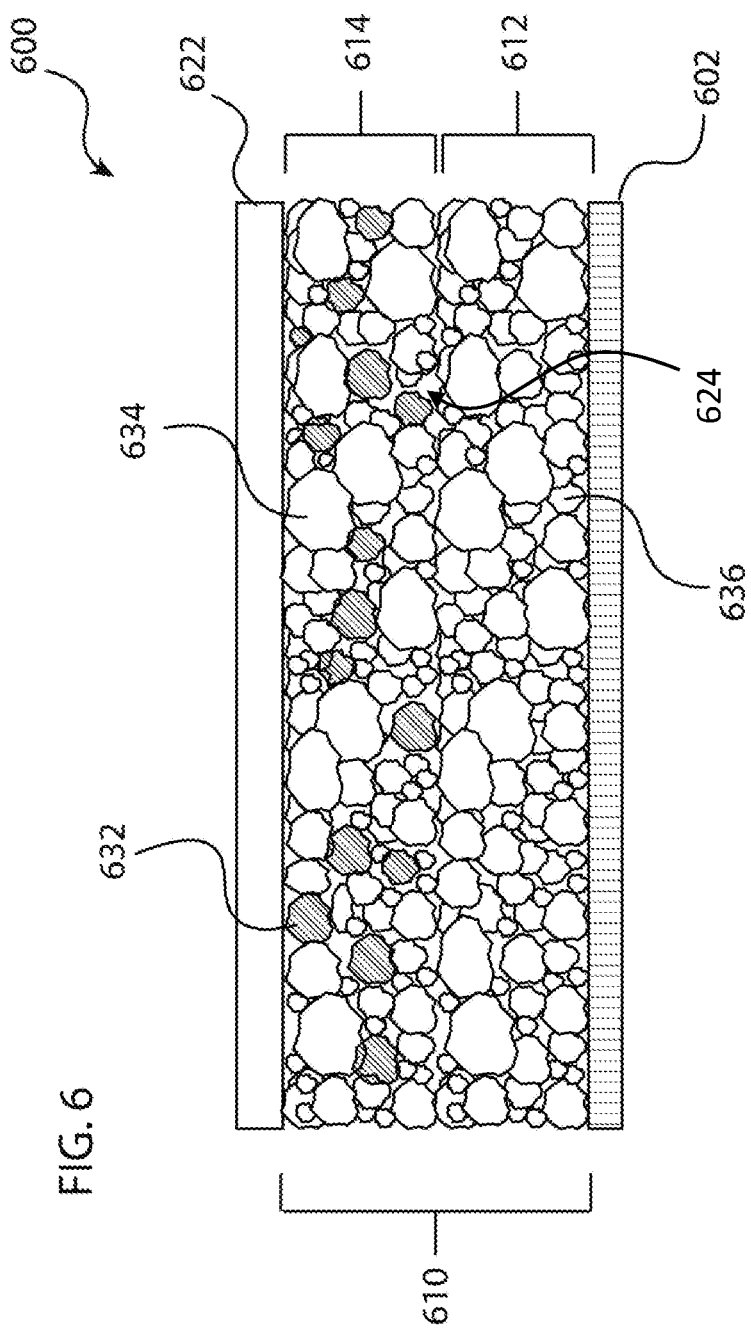
FIG. 6 is a sectional view of a portion of another illustrative electrochemical cell having a multilayered cathode electrode in accordance with aspects of the present disclosure.

FIG. 6 is a partial sectional view of an illustrative electrochemical cell 600 having a multilayered electrode 610. Electrochemical cell 600 includes a separator 622, an electrolyte 624, and a current collector 602. In this example, electrode 610 is a cathode, and includes a first layer 612 adjacent current collector 602 and a second layer 614 intermediate the first layer and separator 622. Both first layer 612 and second layer 614 may be substantially planar, with thicknesses measured relative to a direction perpendicular to current collector 602.

In the present example, first layer 612 includes at least one active material 636 with a first particle size, morphology, and distribution comprising a lithiated transition metal oxide, such as NMC, NCA, LCO, LMO, or the like. Second layer 614 includes at least one active material 634, with a second particle size, morphology, and distribution, again comprising a lithiated transition metal oxide, such as NMC, NCA, LCO, LMO, or the like, and at least one non-active material 632, with a third particle size, morphology, and distribution consisting of a ceramic material, such as aluminum oxide. Generally speaking, cathode materials such as layered oxides (e.g., NMC, NCA, LCO), are active ceramic materials. Accordingly, first composite layer 612 may exhibit lower levels of compressibility as compared to second composite layer 614 when non-active material 632 has a greater hardness than the active cathode materials. In some embodiments, a ratio of the volume of non-active ceramic material 632 to an overall volume of second electrode composite layer 614 may be in a range from 2% to 50%, and in some examples 5% to 50% (i.e., percent by volume). In some examples, non-active ceramic material 632 includes ceramic particles that are microporous, mesoporous, or macroporous, facilitating a greater number of ionic conduction channels through the second layer into the first layer, e.g., for better capacity utilization upon discharge. In some examples, non-active ceramic material 632 includes mesoporous and/or macroporous ceramic particles, e.g., having a surface area of 5 to 1500 $m^2/g$. As mentioned above, the non-active particles incorporated into the second layer create ion-conduction channels to the first layer for improved rate capability. Including porous, non-active ceramic particles having a similar size to the active particles in the second layer of an electrode (anode or cathode) accomplishes a multi-functional benefit, and enhances ion conductivity to the first layer, which would naturally suffer from reduced access to lithium ions. In some examples, other active materials may be utilized in a cathode, such as LFP. In some examples, nonactive ceramic particles may have morphologies resembling agglomerates of smaller particles. This, in effect, creates a high surface area bulk that takes up more volume with less density, thereby serving a similar function as the mesoporous or macroporous particles.

Figure 7:
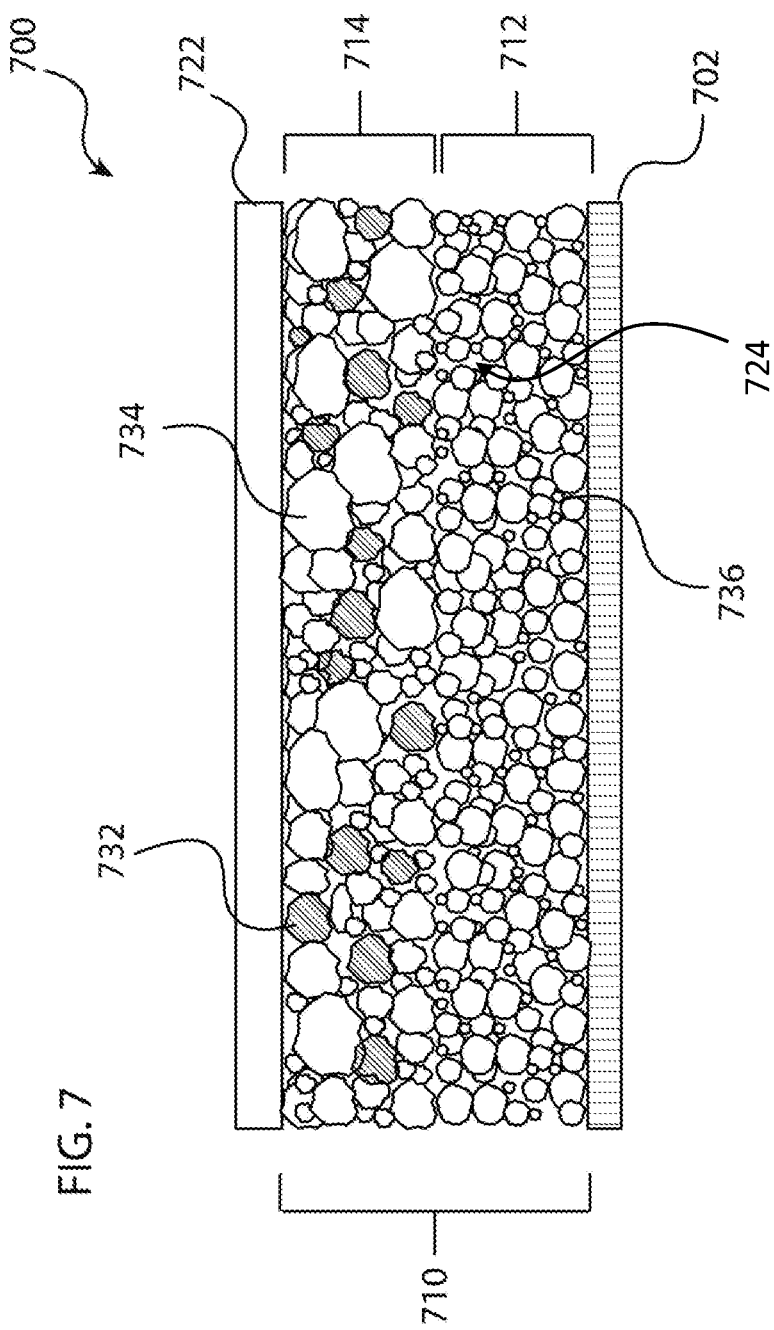
FIG. 7 is a sectional view of a portion of another illustrative electrochemical cell having a multilayered cathode electrode in accordance with aspects of the present disclosure.

FIG. 7 is a partial sectional view of an illustrative electrochemical cell 700 having a multilayered electrode 710. Electrochemical cell 700 includes a separator 722, an electrolyte 724, and a current collector 702. In this example, electrode 710 is a cathode, and includes a first layer 712 adjacent current collector 702 and a second layer 714 intermediate the first layer and separator 722. Both first layer 712 and second layer 714 may be substantially planar, with thicknesses measured relative to a direction perpendicular to current collector 702. Cell 700 is substantially similar to cell 600, with a difference being that the particles in the bottom layer (i.e., first layer 712) are smaller in diameter. This helps to create a desired porosity profile.

Additional aspects and features of multilayer electrodes having non-active ceramic particles in an upper layer are presented without limitation below as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An electrochemical cell comprising: a first electrode and a second electrode on opposing sides of a separator, the first electrode including an active material composite layered onto a current collector substrate; wherein the active material composite of the first electrode comprises: a first layer adjacent to and in contact with the current collector substrate, the first layer including a plurality of first active material particles; a second layer intermediate the first layer and the separator, the second layer including a plurality of second active material particles and a plurality of non-active ceramic particles, such that the second layer is configured to have a higher pore volume fraction than the first layer. In some examples, this may be described as the first layer having a lower porosity than the second layer, or the first layer being denser than the second layer, or the first layer being more compacted than the second layer, or the first layer having a higher degree or percentage of compression than the second layer.

A1. The electrode of A0, the first layer having a first thickness and the second layer having a second thickness, wherein the first thickness is less than the second thickness. This may depend on the original mass loadings of the two layers, etc., such that not all calendering operations (see below) will result in this relationship between the layers of the final electrode.

A2. The electrode of A0 or A1, wherein the non-active ceramic particles are between approximately 2% and approximately 50% of the second layer, by volume.

A3. The electrode of A2, wherein the non-active ceramic particles are between approximately 5% and approximately 20% of the second layer, by volume.

A4. The electrode of any one of paragraphs A0 through A3, wherein the non-active ceramic particles comprise alumina.

A5. The electrode of any one of paragraphs A0 through A4, wherein the electrode comprises an anode.

A6. The electrode of A5, wherein the first active material particles are selected from the group consisting of hard carbons and silicon monoxide.

A7. The electrode of A5, wherein the second active material particles comprise a graphitic carbon.

A8. The electrode of any one of paragraphs A0 through A7, wherein a composition of the first active material particles is substantially identical to a composition of the second active material particles.

E. Illustrative Electrode Layer Calendering Effects

Figure 8:
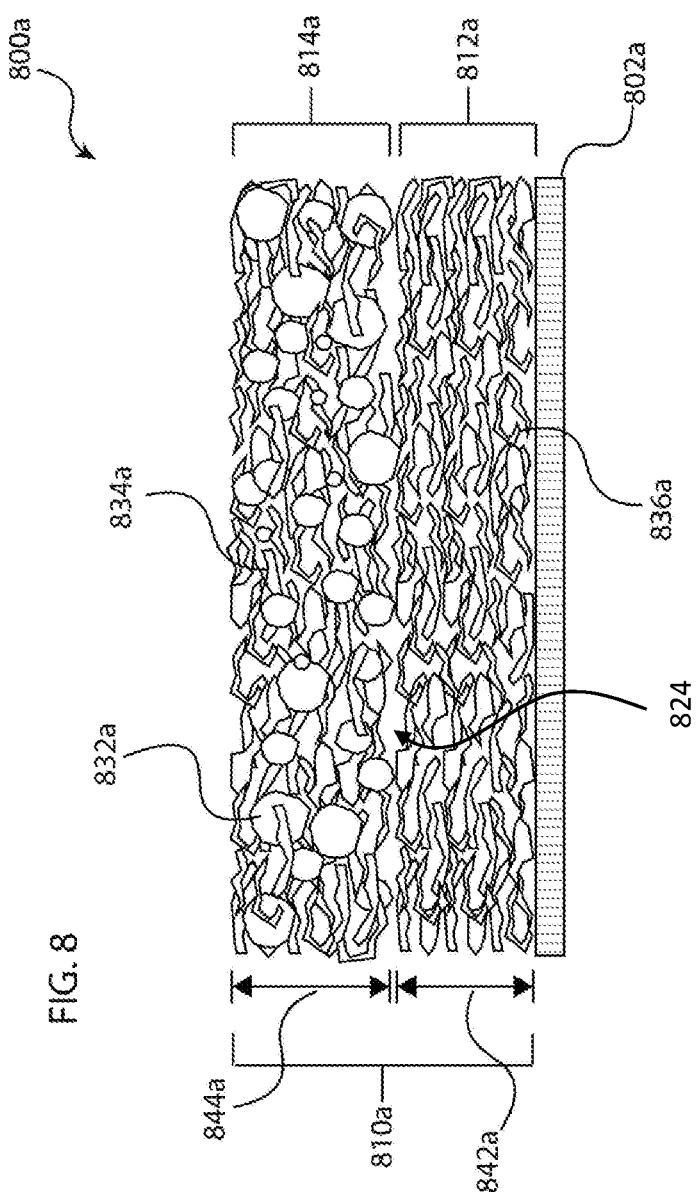
FIG. 8 is a sectional view of an illustrative electrode having non-active ceramic particles in a top layer, in a pre-calendering condition, in accordance with aspects of the present disclosure.
Figure 9:
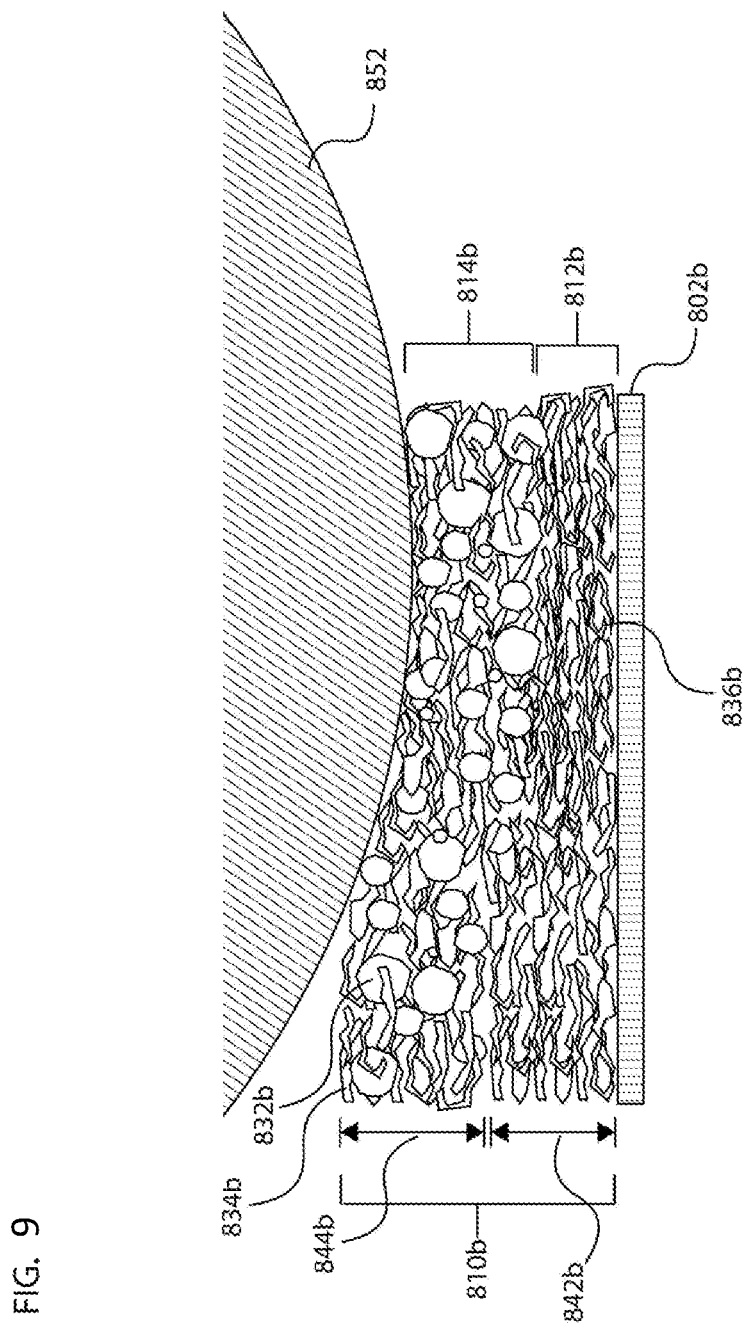
FIG. 9 is a sectional view of the electrode of FIG. 8 in the process of being calendered, in accordance with aspects of the present disclosure.
Figure 10:
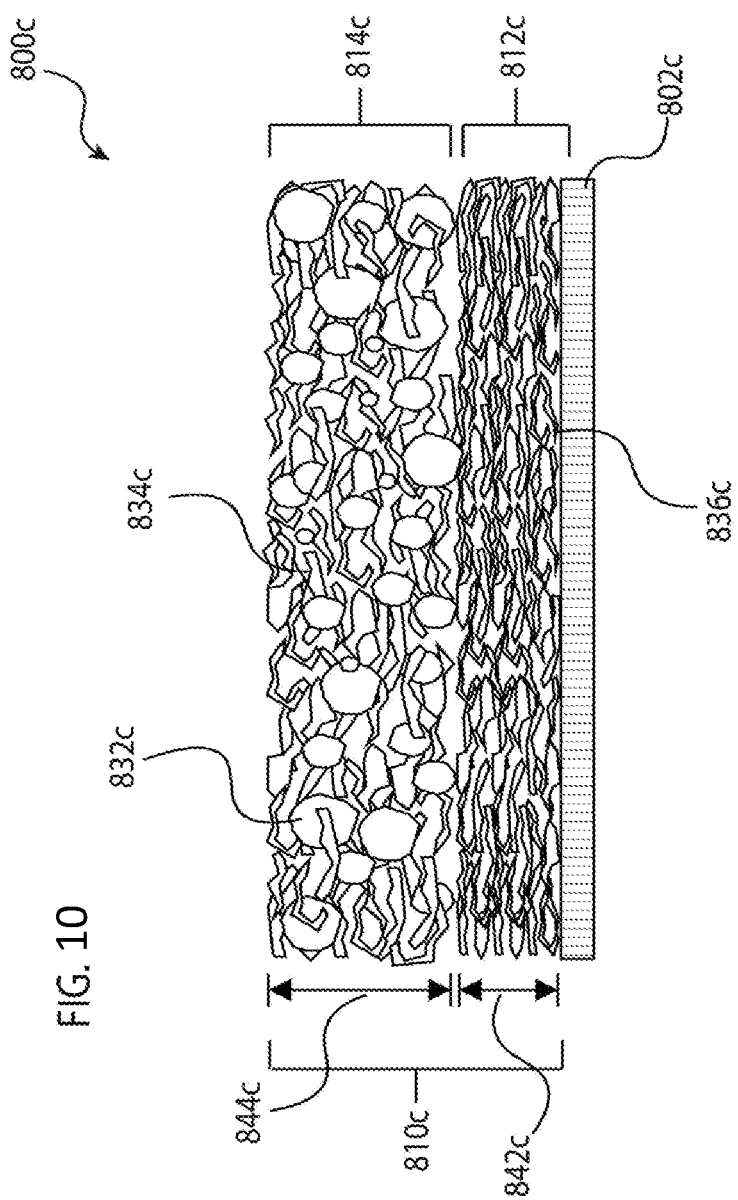
FIG. 10 is a sectional view of the electrode of FIG. 8 in a post-calendering condition, in accordance with aspects of the present disclosure.
Figure 11:
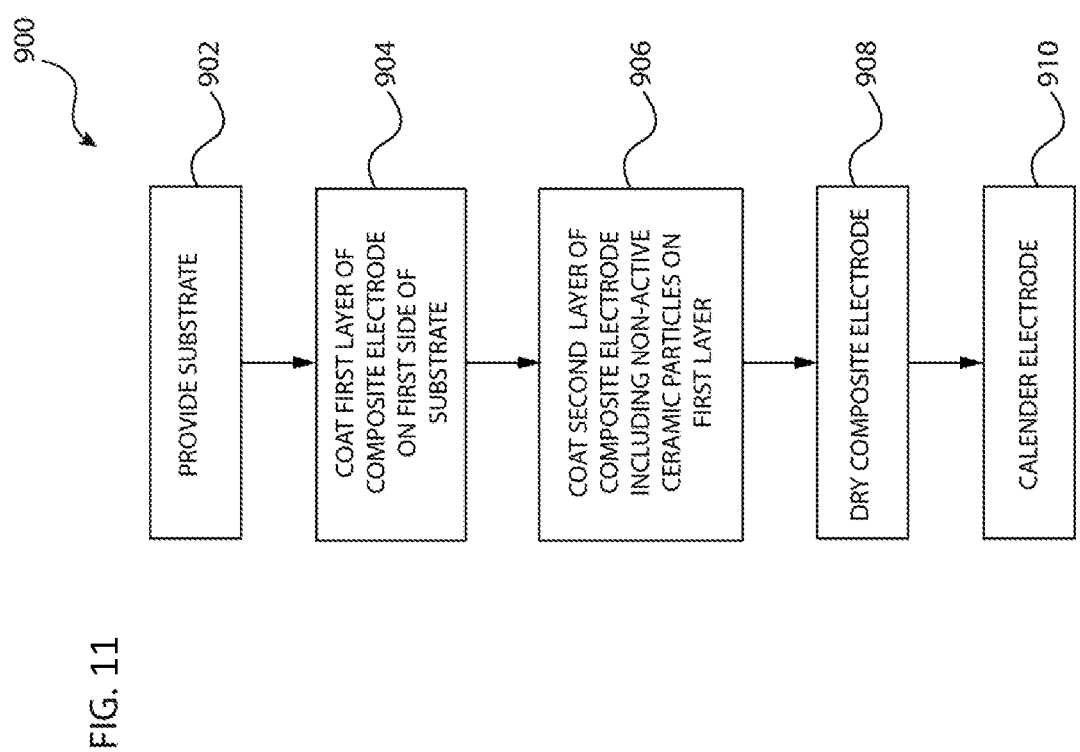
FIG. 11 is a flow chart depicting steps of an illustrative method for manufacturing electrodes according to the present teachings.

As shown in FIGS. 8-10, this section describes the effects of calendering an illustrative electrode incorporating non-active ceramic particle additives within a second composite layer that is separated from the current collector by a first composite layer.

FIGS. 8-10 depict partial sectional views of an illustrative electrochemical cell 800*a/b/c* having a multilayered electrode 810*a/b/c*. Electrochemical cell 800*a/b/c* includes an electrolyte 824 (labeled only in FIG. 8) and a current collector 802*a/b/c*. In this example, electrode 810*a/b/c* is an anode, and includes a first layer 812*a/b/c* adjacent current collector 802*a/b/c* and a second layer 814*a/b/c* intermediate the first layer and separator 822*a/b/c*. Both first layer 812*a/b/c* and second layer 814*a/b/c* may be substantially planar, with thicknesses 842*a/b/c* and 844*a/b/c* measured relative to a direction perpendicular to current collector 802*a/b/c*.

In the present example, first layer 812*a/b/c* includes at least one active material 836*a/b/c* with a first particle size, morphology, and distribution. Second layer 814*a/b/c* includes at least one active material 834*a/b/c*, with a second particle size, morphology, and distribution and at least one non-active material 832*a/b/c*, with a third particle size, morphology, and distribution comprising a ceramic material, such as aluminum oxide. Therefore, first composite layer 812*a/b/c* (i.e., the bottom layer) exhibits lower levels of compressibility as compared to second composite layer 814*a/b/c* (i.e., the top layer).

Thus, the inclusion of non-active ceramic particles 832*a/b/c* in second layer 814*a/b/c* facilitates a significant increase in the overall resistance to densification of second layer 814*a/b/c*. Accordingly, compressive loads imparted by a typical calendering process are transferred to first layer 812*a/b/c*. The resulting post-calendering structure of such an electrode will be a porosity profile in a direction of the thickness of overall electrode composite 810*a/b/c* that is more favorable for electrolyte mobility.

As depicted in FIGS. 8-10, the materials making up the layers of electrode 810*a/b/c* are substantially similar to those of electrode 410 in FIG. 4. However, any suitable active material combination incorporating non-active ceramic particles into the second layer may be utilized.

FIGS. 8, 9, and 10 represent different phases in the calendering process. FIG. 8 depicts electrode 800*a* in a pre-calendering state, e.g., just after the layers have been laid down on the substrate. In this condition, layers 812*a* and 814*a* have initial thicknesses, indicated at 842*a* and 844*a*, respectively. FIG. 9 depicts electrode 800*b* in the process of being compressed by a calendering roller 852. Accordingly, layers 812*b* and 814*b* are both being compressed as the roller passes from right to left in FIG. 9. However, due to the greater resistance to densification in the top layer, the bottom layer is being compressed to a greater degree (see right side of FIG. 9). Finally, FIG. 10 depicts electrode 800*c* after calendering is complete. As indicated by the now-different layer thicknesses 842*c* and 844*c*, bottom layer 812*c* has been compressed more than top layer 814*c*. Due to inclusion of non-active ceramic particles 832*c*, a desired porosity profile has been produced.

F. Illustrative Method for Manufacturing Multi-Layer Electrodes Having Non-Active Ceramic Additives This section describes steps of an illustrative method 900 for manufacturing electrodes having a desirable porosity profile and improved ionic conductivity as a result of including non-active ceramic particles in a top layer, in accordance with aspects of the present disclosure; see FIG. 9. Aspects of the embodiments and methods described above may be utilized in the method steps described below. For example, aspects of the manufacturing process of Section B may be combined with steps below to produce electrodes described in Section D. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. Although various steps of method 900 are described below and depicted in FIG. 9, the steps need not necessarily all be performed, and in some cases may be performed simultaneously or in a different order than the order shown.

At step 902, a current collector substrate is provided, on which the electrode will be built. For example, a foil (e.g., copper foil for anodes or aluminum foil for cathodes) may be provided, e.g., in a roll-to-roll manner.

At step 904 of method 900, the current collector substrate is coated with a first layer of composite electrode material slurry, including a plurality of first active material particles. As described above, these first active material particles may be selected from various materials suitable for either an anode or a cathode, depending on the type of electrode being manufactured. Any suitable coating method may be used for this step and for step 906.

At step 906 of method 900, a second layer of composite electrode material slurry is coated on top of the first layer. This second layer includes second active material particles (which may or may not be different from the first active material particles) and a plurality of non-active ceramic particles. As described above, these ceramic particles may comprise alumina, to provide added resistance to compression (i.e., resistance to densification) in later steps. Active material particles may be selected based on their characteristics and/or whether an anode or a cathode is being manufactured.

In some examples, steps 904 and 906 are performed simultaneously. In some examples, steps 904 and 906 are performed sequentially.

At step 908, the composite electrode (i.e., substrate plus two layers) is dried. Drying includes causing the solvent material used in the slurries to evaporate, and may be performed using at least one drying oven. In some examples, step 908 may be performed as two separate steps, wherein a first drying step is performed following step 904, to dry the first layer, and a second drying step is performed following step 906, to dry the second layer.

At step 910, the dried composite electrode is calendered. For example, calendering may be conducted as described above in Section B, e.g., by applying compressive forces using two opposing rollers. Illustrative effects of this calendering step on the ceramic-included electrode are described with respect to FIGS. 8-10. Specifically, a height or thickness of the second (i.e., top) layer may be reduced less than a height or thickness of the first (i.e., bottom) layer. Initial and final thicknesses of the respective layers will depend, at least in part, on their original mass loadings. In other words, the percentage change in thickness is greater in the bottom layer, but not necessarily the absolute change in thickness.

In summary, a method of manufacturing an electrochemical cell electrode may include:

(a) forming a first layer by coating a first active material composite onto a current collector substrate, wherein the first active material composite includes a plurality of first active material particles;

(b) forming a second layer by coating a second active material composite onto the first layer, wherein the second active material composite includes a plurality of second active material particles and a plurality of non-active ceramic particles, such that the second layer is configured to have a greater resistance to densification than the first layer; wherein the first layer, the second layer, and the current collector substrate collectively form a composite electrode;

(c) drying the composite electrode (either after each layer is formed or collectively); and (d) calendering the composite electrode by applying a compressive force to an exposed face of the second layer; wherein calendering the electrode causes the first layer to be compressed to a greater degree than the second layer.

Calendering the electrode causes a greater percent change in thickness of the first layer than is the case for the second layer, due to the inclusion of the non-active ceramic particles. In some examples, calendering the electrode causes the first layer to have a smaller thickness than the second layer, but this is dependent, e.g., on initial mass loadings. In some examples, the final layer thicknesses may be substantially equivalent, or the first layer may be thicker than the second layer (albeit wherein the first layer has a lower porosity). In some examples, the second active material composite comprises approximately 2% to approximately 50% non-active ceramic particles, by volume. In some examples, the second active material composite comprises approximately 2% to approximately 50% non-active ceramic particles, by weight. In some examples, the second active material composite comprises approximately 5% to approximately 20% non-active ceramic particles, by volume. The non-active ceramic materials may comprise alumina. In some examples, this method may further include coupling a separator to the exposed face of the second layer. In some examples, the composite electrode may be an anode. Based on that, the first active material particles may be hard carbons and/or silicon monoxide. The second active material particles may include a graphitic carbon.

In some examples, the manufacturing method may be summarized as follows:

(a) forming a first layer by coating a first active material composite onto a current collector substrate, wherein the first active material composite includes a plurality of first active material particles;

(b) forming a second layer by coating a second active material composite onto the first layer, wherein the second active material composite includes a plurality of second active material particles and a plurality of non-active particles having a hardness greater than that of the first active material particles, such that the second layer is configured to have a lower overall compressibility than the first layer; wherein the first layer, the second layer, and the current collector substrate collectively form a composite electrode; and (c) causing the first layer to be compressed to a greater degree than the second layer by calendering the composite electrode.

The non-active particles may include a non-active ceramic material making up approximately 2% to approximately 50% of the second layer, by volume. As mentioned above, the non-active ceramic material may comprise alumina and/or may make up approximately 5% to approximately 20% of the second layer, by volume.

Advantages, Features, and Benefits

The different embodiments and examples of the electrochemical cells and electrodes described herein provide several advantages over known solutions. For example, illustrative embodiments and examples described herein create electrodes having beneficial porosity profiles automatically upon calendering.

Additionally, and among other benefits, illustrative embodiments and examples described herein facilitate manufacturing of the improved electrodes using standard manufacturing equipment.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electrochemical cell comprising:
a first electrode and a second electrode on opposing sides of a separator, the first electrode including an active material composite layered onto a current collector substrate;
wherein the active material composite of the first electrode comprises:
a first layer adjacent to and in contact with the current collector substrate, the first layer including a plurality of first active material particles;
a second layer intermediate the first layer and the separator, the second layer including a plurality of second active material particles mixed with a plurality of non-active ceramic particles consisting of a non-active mesoporous or macroporous ceramic material, the ceramic particles collectively configured to provide conduction channels through the second layer into the first layer, wherein particle sizes of the second active material particles and of the non-active ceramic particles have a same order of magnitude, each one of the plurality of non-active ceramic particles consisting of a non-active ceramic material, such that the second layer is configured to have a higher pore volume fraction than the first layer.

2. The electrochemical cell of claim 1, the first layer having a first thickness and the second layer having a second thickness, wherein the first thickness is less than the second thickness.

3. The electrochemical cell of claim 1, wherein the non-active ceramic particles are 2% to 50% of the second layer, by volume.

4. The electrochemical cell of claim 3, wherein the non-active ceramic particles are at least 5% of the second layer, by volume.

5. The electrochemical cell of claim 1, wherein the non-active ceramic particles comprise alumina.

6. The electrochemical cell of claim 1, wherein the first electrode comprises an anode.

7. The electrochemical cell of claim 6, wherein the first active material particles are selected from the group consisting of hard carbons and silicon monoxide.

8. The electrochemical cell of claim 6 wherein the second active material particles comprise a graphitic carbon.

9. The electrochemical cell of claim 1, wherein a composition of the first active material particles is substantially identical to a composition of the second active material particles.

10. The electrochemical cell of claim 1, wherein the non-active ceramic particles have a surface area of 5 $m^2/g$ to 1500 $m^2/g$.

11. An electrode comprising:
an active material composite layered onto a current collector substrate,
wherein the active material composite of the first electrode comprises:
a first layer adjacent to and in contact with the current collector substrate, the first layer including a plurality of first active material particles;
a second layer intermediate the first layer and a separator, the second layer including a plurality of second active material particles mixed with a plurality of non-active ceramic particles, each one of the plurality of non-active ceramic particles consisting of a non-active mesoporous or macroporous ceramic material configured to provide conduction channels through the second layer into the first layer, such that the second layer is configured to have a higher pore volume fraction than the first layer, and wherein the electrochemically inactive ceramic particles have particle sizes on a same order of magnitude as the second active material particles.

12. The electrode of claim 11, the first layer having a first thickness and the second layer having a second thickness, wherein the first thickness is less than the second thickness.

13. The electrode of claim 11, wherein the non-active ceramic particles are 2% to 50% of the second layer, by volume.

14. The electrode of claim 13, wherein the non-active ceramic particles are at least 5% of the second layer, by volume.

15. The electrode of claim 11, wherein the non-active ceramic particles comprise alumina.

16. The electrode of claim 11, wherein the electrode comprises an anode.

17. The electrode of claim 16, wherein the first active material particles are selected from the group consisting of hard carbons and silicon monoxide.

18. The electrode of claim 16, wherein the second active material particles comprise a graphitic carbon.

19. The electrode of claim 11, wherein a composition of the first active material particles is substantially identical to a composition of the second active material particles.

20. The electrode of claim 11, wherein the non-active ceramic particles have a surface area of 5 $m^2/g$ to 1500 $m^2/g$.

* * * * *